United States Patent
Kuroiwa

(10) Patent No.: US 7,589,842 B2
(45) Date of Patent: Sep. 15, 2009

(54) OPTICAL TOMOGRAPH FOR AUTOMATICALLY ADJUSTING OPTICAL PATH LENGTH DIFFERENCES

(75) Inventor: Karin Kuroiwa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/864,263

(22) Filed: Sep. 28, 2007

(65) Prior Publication Data

US 2008/0079949 A1     Apr. 3, 2008

(30) Foreign Application Priority Data

Sep. 29, 2006  (JP) .............................. 2006-268415

(51) Int. Cl.
    *G01B 11/02*  (2006.01)
(52) U.S. Cl. ....................... 356/497; 356/479
(58) Field of Classification Search ............... 356/473, 356/479, 497
    See application file for complete search history.

(56) References Cited

U.S. PATENT DOCUMENTS

| | | | |
|---|---|---|---|
| 5,565,986 A | 10/1996 | Knuttel | |
| 6,377,349 B1 | 4/2002 | Fercher | |
| 2005/0075547 A1* | 4/2005 | Wang | 600/316 |
| 2006/0077395 A1* | 4/2006 | Chan et al. | 356/497 |

FOREIGN PATENT DOCUMENTS

JP     2003-172690 A    6/2003

OTHER PUBLICATIONS

M. Takeda, Optical Frequency Scanning Interference Microscopes, Optics Engineering Contact, 2003, pp. 426-432, vol. 41, No. 7, and its partial translation.

* cited by examiner

Primary Examiner—Tarifur Chowdhury
Assistant Examiner—Michael Lapage
(74) Attorney, Agent, or Firm—Sughrue Mion, PLLC

(57) ABSTRACT

An optical tomograph obtains tomographic images by administering frequency analysis on an interference light beam formed by interference between a reflected light beam, which is a measuring light beam reflected by a measurement target, and a reference light beam. A tomographic data obtaining section obtains tomographic data to be used for optical path length adjustment each time that the position, onto which the measuring light beam is irradiated, is changed. An optical path length adjusting section adjusts the optical path length of one of the measuring light beam, the reflected light beam, and the reference light beam, based on the obtained tomographic data.

27 Claims, 10 Drawing Sheets

OPTICAL TOMOGRAPH FOR AUTOMATICALLY ADJUSTING OPTICAL PATH LENGTH DIFFERENCES

BACKGROUND OF THE INVENTION

1. Field of the Invention

The present invention relates to an optical tomograph that obtains optical tomographic images by OCT (Optical Coherence Tomography) measurement.

2. Description of the Related Art

Conventionally, ultrasonic tomographs that employ ultrasonic waves are employed to obtain tomographic images of the interiors of body cavities. Optical tomographs that employ light interference of low interference light have also been proposed (refer to Japanese Unexamined Patent Publication No. 2003-172690, for example). The optical tomograph disclosed in Japanese Unexamined Patent Publication No. 2003-172690 is that which obtains tomographic images by time domain measurement. In this optical tomograph, a probe is inserted through the forceps opening and the forceps channel of an endoscope, to guide a measuring light beam into a body cavity.

Specifically, a low coherence light beam emitted from a light source is divided into a measuring light beam and a reference light beam. Thereafter, a reflected light beam, which is the measuring light beam reflected by a measurement target when the measuring light beam is irradiated onto the measurement target, is guided to a combining means. Meanwhile, the reference light beam is guided to the combining beams after the optical path length thereof is changed. The combining means combines the reflected light beam and the reflected light beam, and the resulting interference light beam is measured by heterodyne detection or the like. Time domain measurement utilizes the fact that interference light beams are detected when the optical path length of the measuring light beam and the reflected light match the optical path length of the reference light beam. The measurement position (measurement depth) within measurement targets beam is changed, by varying the optical path length of the reference light beam.

Recently, frequency domain OCT measurement, which obtains optical tomographic images at high speeds without sweeping the optical path length of a reference light beam, by spatially or temporally spectrally analyzing an interference light beam, has been proposed (refer to U.S. Pat. Nos. 5,565,986 and 6,377,349, for example). SD-OCT (Spectral Domain OCT) measurement that spectrally decomposes an interference light beam spatially, and SS-OCT (Swept Source OCT) measurement that spectrally decomposes an interference light beam temporally, are known as methods of measurement for frequency domain OCT.

In SD-OCT measurement, the frequency of a light beam emitted from a light source is spatially spectrally decomposed, and detection of an interference light beam is performed at single moments in time. For example, an SD-OCT optical tomograph divides a wide band low coherence light beam emitted by a light source into a measuring light beam and a reference light beam by a Michelson interferometer. Then, the measuring light beam is irradiated onto a measurement target, and a reflected light beam, which is the measuring light beam reflected by the measurement target, is combined with the reference light beam, to obtain an interference light beam. Thereafter, the interference light beam is decomposed into different frequency components. The channeled spectra of the decomposed interference light beam undergo Fourier analysis, and tomographic images are obtained without scanning in the depth direction.

In SS-OCT measurement, a coherent light beam emitted from a light source is divided into a measuring light beam and a reference light beam, and a reflected light beam, which is the measuring light beam reflected by a measurement target, is combined with the reference light beam. Optical tomographic images are obtained, based on the intensity of an interference light beam formed by interference between the reflected light beam and the reference light beam. In SS-OCT measurement, an interference light beam is detected while varying the frequency of the light beam emitted from the light source over time. An SS-OCT optical tomograph sweeps the frequency of a laser beam which is emitted from a light source, using a Michelson interferometer, for example. Reflected light beams of each wavelength are caused to interfere with the reference light beam. The intensities of reflected light beams at depth positions within a measurement target are obtained from interferograms of optical frequency bands, and tomographic images are obtained employing the detected intensities.

In this manner, frequency domain OCT apparatuses are capable of obtaining reflectance, that is, tomographic data, at each depth position, by performing frequency analysis.

In frequency domain OCT apparatuses, positions relative to a reference point, at which an optical path difference is zero, can be obtained. Therefore, in principle, it is not necessary to match the combined optical path length of a measuring light beam and a reflected light beam with the optical path length of a reference light beam. In practice, however, in the case that an optical path difference is great, the spatial frequency of an interference signal tends to be amplified. Therefore, the maximum optical path length difference is necessarily defined by the spatial resolution or a temporal resolution of a photodetector that detects an interference light beam. That is, in an SD-OCT apparatus, the range of optical path length differences for which tomographic data can be obtained is determined by the intervals between photodiodes, which is the spatial resolution, in the case that a photodiode array is employed as a photodetector. Similarly, in an SS-OCT apparatus, the range of optical path length differences for which tomographic data can be obtained is determined by a sampling interval of a photodetector, which is the temporal resolution.

For this reason, it is necessary to adjust an optical path difference at least prior to obtainment of optical tomographic data, such that a measurement target is included within a range of optical path length differences, within which optical tomographic data can be obtained. Accordingly, an optical path length adjusting means is generally included within the optical path of the measurement light beam or the reference light beam in optical tomographs. Normally, an operator sets an optical path length prior to obtaining a desired optical tomographic image, obtains the optical tomographic image, then causes the optical tomographic image to be displayed on a display device. The operator views the displayed optical tomographic image, then adjusts the optical path length adjusting means manually such that a measurement target is included in the next optical tomographic image. Thereafter, the desired optical tomographic image is obtained.

However, the optical lengths of a measuring light beam and a reference light beam may change due to temperature fluctuations. In addition, if optical fibers are employed to guide the measuring light beam and the reference light beam, there are cases in which bending of the optical fibers can cause changes in the optical path lengths thereof. For these reasons, there are cases in which an optical tomographic image of a desired measurement target cannot be favorably obtained, due to shifting in the obtainment position (depth) caused by changes in the optical path lengths during obtainment of the optical tomographic image.

SUMMARY OF THE INVENTION

The present invention has been developed in view of the foregoing circumstances. It is an object of the present invention to provide an optical tomograph that obtains optical tomographic images of measurement targets by detecting interference light beams formed by measuring light beams and reference light beams and administering frequency analysis on the detected interference light beams, in which optical path length differences can be automatically adjusted at desired timings.

An optical tomograph of the present invention comprises:

a light source unit for emitting a light beam;

a light dividing section, for dividing the light beam emitted from the light source unit into a measuring light beam and a reference light beam;

an irradiating section, for scanning and irradiating a measurement target with the measuring light beam, which has been divided by the light dividing section;

a combining section, for combining a reflected light beam, which is the measuring light beam reflected by the measurement target, and the reference light beam;

a first interference light detecting section, for detecting an interference light beam, which is formed by the reflected light beam and the reference light beam being combined by the combining section;

a tomographic data obtaining section, for obtaining tomographic data of the measurement target at each scanning position, by administering frequency analysis on the interference light beam detected by the first interference light detecting section;

a second interference light detecting section, for detecting the interference light beam; and an optical path length adjusting section, for adjusting the optical path length of one of the measuring light beam, the reflected light beam, and the reference light beam, based on the detection results obtained by the second interference light detecting section.

Note that the "reflected light beam, which is the measuring light beam reflected by the measurement target" includes light scattered by the measurement target, in addition to light reflected by the measurement target. In addition, "scanning and irradiating a measurement target with the measuring light beam" may refer to a case in which the measuring light beam is irradiated onto the measurement target while being moved continuously. Alternatively, "scanning and irradiating a measurement target with the measuring light beam" may refer to a case in which the procedures of stopping the measuring light beam temporarily at each scanning position, irradiating the measurement target, then moving the measuring light beam again, are repeated.

A configuration may be adopted, wherein the optical tomograph further comprises:

an optical path length changing section; wherein the second interference light detecting section outputs an integrated value, in which the interference light is spatially or temporally integrated; and the optical path length adjusting section compares the integrated value output by the second interference light detecting section prior to and following the optical path length changing section changing the optical path length, and adjusts the optical path length based on the results of the comparison.

Further, a configuration may be adopted, wherein: the optical path length adjusting section adjusts the optical path length of one of the measuring light beam, the reflected light beam, and the reference light beam, based on a plurality of detection results obtained from a plurality of scanning positions within the measurement target.

Still further, a configuration may be adopted, wherein:

the first interference light detecting section also functions as the second interference light detecting section.

The optical tomograph of the present invention may further comprise:

a light separating section, for separating the interference light beam into a light beam that enters the first interference light detecting section, and a light beam that enters the second interference light detecting section.

The optical tomograph of the present invention comprises: the light source unit for emitting a light beam; the light dividing section, for dividing the light beam emitted from the light source unit into a measuring light beam and a reference light beam; the irradiating section, for scanning and irradiating a measurement target with the measuring light beam, which has been divided by the light dividing section; the combining section, for combining a reflected light beam, which is the measuring light beam reflected by the measurement target, and the reference light beam; the first interference light detecting section, for detecting an interference light beam, which is formed by the reflected light beam and the reference light beam being combined by the combining section; the tomographic data obtaining section, for obtaining tomographic data of the measurement target at each scanning position, by administering frequency analysis on the interference light beam detected by the first interference light detecting section; the second interference light detecting section, for detecting the interference light beam; and the optical path length adjusting section, for adjusting the optical path length of one of the measuring light beam, the reflected light beam, and the reference light beam, based on the detection results obtained by the second interference light detecting section. Therefore, the optical path length difference can be adjusted automatically at a desired timing, such as every time that optical tomographic data is obtained, thereby improving the utility of the tomograph.

A configuration may be adopted, wherein: the second interference light detecting section outputs integrated values, in which the interference light is spatially or temporally integrated; the second interference light detecting section is equipped with an optical path length changing section; the optical path length adjusting section compares the integrated value output by the second interference light detecting section prior to and following the optical path length changing section changing the optical path length, and adjusts the optical path length based on the results of the comparison. In this case, the use of the integrated value reduces the effect of noise, and therefore the optical path length can be adjusted more accurately.

Further, a configuration may be adopted, wherein: the optical path length adjusting section adjusts the optical path length of one of the measuring light beam, the reflected light beam, and the reference light beam, based on a plurality of detection results obtained from a plurality of scanning positions within the measurement target. In this case, the adjustment of the optical path length based on the plurality of detection results reduces the effects of margins of error, and therefore the optical path length can be adjusted more accurately.

Still further, a configuration may be adopted, wherein: the first interference light detecting section also functions as the second interference light detecting section. In this case, the tomograph can be miniaturized.

The optical tomograph of the present invention may further comprise: a light separating section, for separating the interference light beam into a light beam that enters the first interference light detecting section, and a light beam that enters the second interference light detecting section. In this case, any desired detecting means may be utilized as the second interference light detecting section, and the optical path length can be adjusted in a shorter amount of time.

DESCRIPTION OF THE PREFERRED EMBODIMENTS

Figure 1:
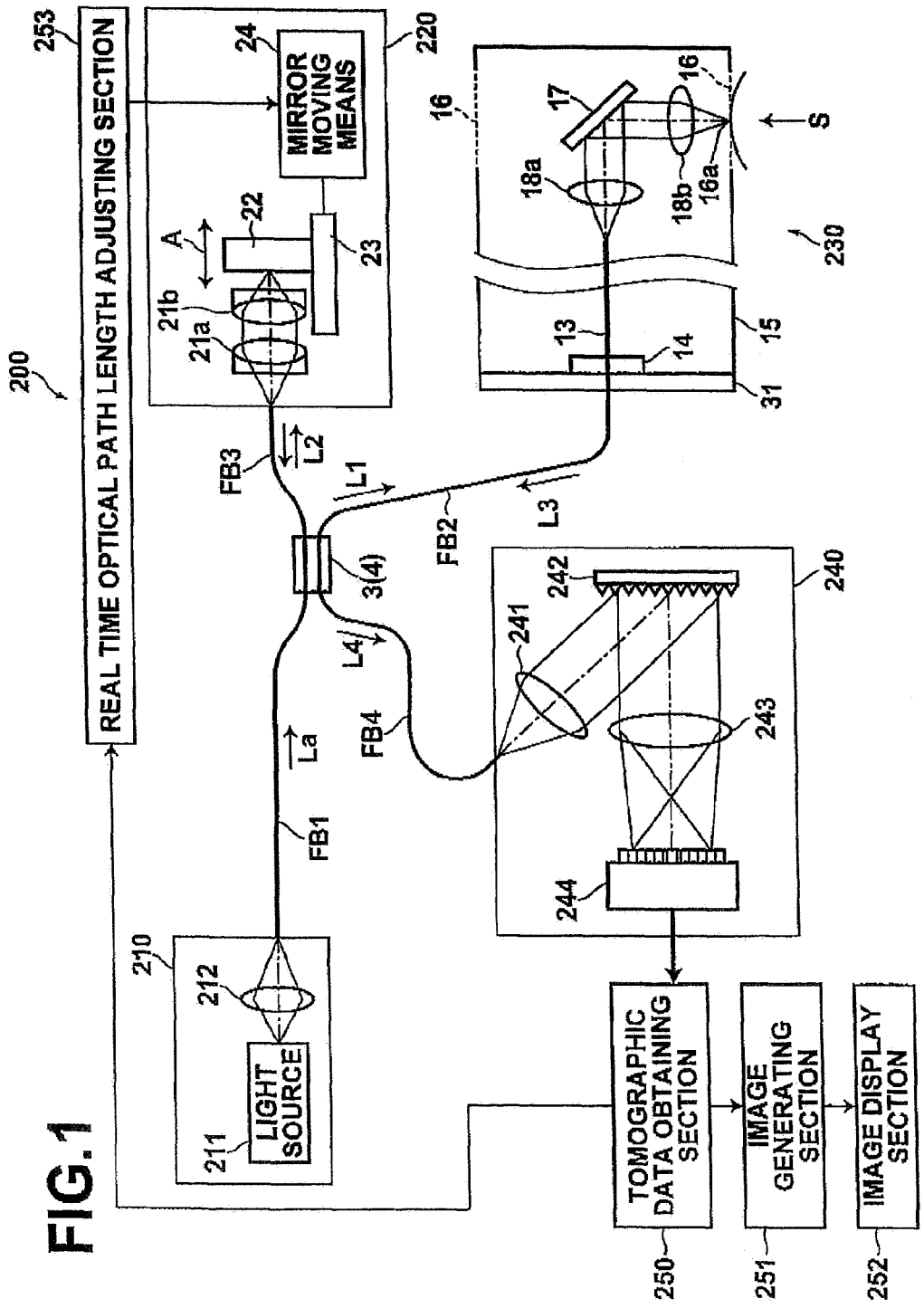
FIG. 1 is a diagram that illustrates the schematic structure of an optical tomograph according to a first embodiment of the present invention.

Hereinafter, an optical tomograph according to a first embodiment of the present invention will be described, with reference to FIG. 1. FIG. 1 is a diagram that illustrates the schematic structure of an optical tomograph 200 according to the first embodiment of the present invention.

The optical tomograph 200 obtains tomographic images of measurement targets, such as living tissue and cells within body cavities, by SS-OCT measurement. The optical tomograph 200 comprises: a light source unit 210, for emitting a light beam La; a light dividing means 3, for dividing the light beam La emitted from the light source unit 10 into a measuring light beam L1 and a reference light beam L2; an optical path length adjusting means 220, for adjusting the optical path length of the reference light beam L2 output by the light dividing means 3; an optical probe 230, for guiding the measuring light beam L1 output by the light dividing means 3 to a measurement target S; a combining means 4, for combining and a reflected light beam L3, which is the measuring light beam L1 reflected by the measurement target S, and the reference light beam L2; an interference light detecting means 240, for detecting an interference light beam L4, which is the reflected light beam L3 and the reference light beam L2 which are combined by the combining means 4; a tomographic data obtaining section 250, for obtaining tomographic data from the detection results of the interference light detecting means 240; an image generating section 251, for generating a tomographic image of the measurement target S from the tomographic data obtained by the tomographic data obtaining section 250; an image display section 252, for displaying the tomographic image generated by the image generating section 251; and a real time optical path length adjusting section 253, for adjusting the optical path length of the reference light beam L2, based on the tomographic data obtained by the tomographic data obtaining section 250.

The light source unit 210 comprises: an SLD 211 (Super Luminescent Diode) that emits the low coherence light beam La having a central wavelength $\lambda c$ of 1.1 μm and a full width at half maximum spectrum $\Delta\lambda$ of 90 nm; and an optical system 212, for causing the light beam La emitted from the SLD 211 to enter an optical fiber FB1.

The light dividing means 3 is constituted by a 2×2 optical fiber coupler, for example. The light dividing means 3 functions to divide the light beam La emitted by the light source unit 210 and guided through the optical fiber FB1 into the measuring light beam L1 and the reference light beam L2. The light dividing means 3 is optically connected to optical fibers FB2 and FB3. The measuring light beam L1 is guided through the optical fiber FB2, and the reference light beam L2 is guided through the optical fiber FB3. Note that the light dividing means 3 of the present embodiment also functions as the combining means 4.

The optical fiber FB2 is optically connected to the optical probe 230, and the measuring light beam is guided through the optical fiber FB2 to the optical probe 230. The optical probe 230 is to be inserted into body cavities via a forceps opening and a forceps channel, and is removably mounted to the optical fiber FB2 with an optical connector 31.

The optical probe 230 comprises: a probe outer cylinder 15, which has a closed distal end; a single optical fiber 13, which is provided to extend along the axial direction of the outer cylinder 15 within the interior thereof; a mirror 17, for deflecting the measuring light beam L1 emitted from the distal end of the optical fiber 13; focusing lenses 18a and 18b, for focusing the measuring light beam L1 emitted from the distal end of the optical fiber 13 such that it converges on the measurement target S, which surrounds the outer cylinder 15; and a motor 14, for rotating the optical fiber 13 with the axis thereof as the rotational axis. Note that the optical fiber 13, the focusing lenses 18a and 18b, and the mirror 17 are integrally constructed. Therefore, when the optical fiber 13 is rotated, the focusing lenses 18a and 18b and the mirror 17 also rotate. An annular window 16 that transmits the measuring light beam L1 is provided at the distal end of the probe outer cylinder 15.

The optical path length adjusting means 220 is provided at the end of the optical fiber PFB3 from which the reference light beam L2 is emitted. The optical path length adjusting means 220 functions to change the optical path length of the reference light beam L2, to adjust the position at which tomographic images of the measurement target S are obtained. The optical path length adjusting means 220 comprises: a mirror 22, for reflecting the reference light beam L2 emitted from the optical fiber FB3; a first optical lens 21a, provided between the optical fiber FB3 and the mirror 22; and a second optical lens 21b, provided between the first optical lens 21a and the mirror 22.

The first optical lens 21a functions to collimate the reference light beam L2 emitted from the optical fiber FB3, and to focus the reference light beam L2 reflected by the mirror 22 onto the core of the optical fiber FB3. The second optical lens 21b functions to focus the reference light beam L2 collimated by the first optical lens 21a onto the mirror 22, and to collimate the reference light beam L2 reflected by the mirror 22. That is, the first optical lens 21a and the second optical lens 21b form a confocal optical system.

Accordingly, the reference light beam L2 emitted from the optical fiber FB3 is collimated by the first optical lens 21a, and focused on the mirror 22 by the second optical lens 21b. Thereafter, the reference light beam L2 reflected by the mirror 22 is collimated by the second optical lens 21b, and focused onto the core of the optical fiber FB3 by the first optical lens 21a.

The optical path length adjusting means 220 further comprises: a movable base 23, on which the second optical lens 21b and the mirror 22 are fixed; and a mirror moving means 24, for moving the movable base 23 in the direction of the optical axis of the first optical lens 21a. The optical path length of the reference light beam L2 is varied, by moving the movable base 23 in the direction indicated by arrow A.

The combining means 4 is constituted by the aforementioned 2×2 optical coupler. The combining means 4 combines the reference light beam L2, of which the optical path length has been adjusted by the optical path length adjusting means 220, and the reflected light beam L3 reflected by the measurement target S. The combined interference light beam L4 is emitted toward the interference light detecting means 40 via an optical fiber FB4.

The interference light detecting means 240 spatially spectrally decomposes the interference light L4, formed by the combining means 4 combining the reflected light beam L3 and the reference light beam L4, to decompose the interference light beam L4 into wavelength components and to detect channeled spectra signals from the wavelength components. The interference light detecting means 240 comprises: a collimating lens 241, for collimating the interference light beam L4 emitted from the optical fiber FB4; a diffraction grating 242, for spectrally separating the interference light beam L4 into wavelength components; and a CCD array 244, for detecting each wavelength component of the spectrally decomposed interference light beam L4.

The CCD array 244 is constituted by optical sensors are arranged one dimensionally or two dimensionally. Each of the optical sensors is configured to detect each wavelength band component of the spectrally decomposed interference light beam L4, respectively.

The CCD array 244 is connected to the tomographic data obtaining section 250. The tomographic data obtaining section 250 is connected to the image generating section 251 and the real time optical path length adjusting section 253. The image generating section 251 is connected to the image display section 252, which is aCRT, a liquid crystal display, or the like. The real time optical path length adjusting section 253 is connected to the optical path length adjusting means 220.

The tomographic data obtaining section 250 administers frequency analysis on the channeled spectra signals of the interference light beam L4 detected by the CCD array 244, to obtain tomographic data composed by reflectance data at each depth position. The image generating section 251 generates a tomographic image, based on the tomographic data which were obtained while shifting measurement positions. The generated tomographic image is displayed by the image display section 252.

Note that a detailed description of the detection of the interference light beam L4 and generation of the image by the interference light detecting means 240, the tomographic data obtaining section 250, and the image generating section 251 can be found in M. Takeda, "Optical Frequency Scanning Interference Microscopes", Optical engineering Contact, Vol. 41, No. 7, pp. 426-432, 2003.

Note that the tomographic data obtaining section 250, the image generating section 251 and the real time optical path length adjusting section 253 are realized by a computer system such as a personal computer.

Hereinafter, the operation of the optical tomograph 200 having the construction described above will be described. To facilitate understanding of the operation, first, the method by which tomographic data is obtained and a tomographic image is generated will be described. Thereafter, the entire operation of the optical tomograph 200 will be described.

The low coherence light beam La is emitted by the light source unit 210, and the low coherence light beam La is divided into the measuring light beam L1 and the reference light beam L2 by the light dividing means 3. The measuring light beam L1 is emitted within the body cavity from the optical probe 230, and irradiated on the measurement target S. At this time, the measuring light beam L1 is scanned one dimensionally along the measurement target S by the aforementioned operation of the optical probe 230. The reflected light beam L3, which is reflected by the measurement target S, is combined with the reference light beam L2, which is reflected by the mirror 22, to form the interference light beam L4. The interference light beam L4 is detected by the interference light detecting means 240. The tomographic data obtaining section 250 administers appropriate waveform correction and noise removal on the detected interference signal. Then, the tomographic data obtaining section 250 administers Fourier transform on the interference signal, and reflected light intensity distribution data is obtained regarding the depth direction of the measurement target S. The reflected light intensity distribution data is output to the image generating section 251, and stored in a memory (not shown).

After obtaining the tomographic data, the optical fiber 13, the focusing lenses 18a and 18b, and the mirror 17 are rotated slightly. Then, the above operations are repeated to obtain tomographic data at a position slightly shifted from the first position at which tomographic data was obtained. These operations are repeated in this manner, and optical tomographic data are obtained for each point that the measuring light beam L1 is irradiated on. Thereby, tomographic data of the measurement target S are obtained for each portion along the rotating direction of the measuring light beam L1. The tomographic data are sequentially output to the image generating section 251, and stored in the memory (not shown) thereof. Tomographic data for a full rotation is obtained by the measuring light beam L1 being rotated a single rotation, that is, by scanning the measurement target S with the measuring light beam L1, and stored in the memory of the image generating section 251. Thereafter, a tomographic image representing an annular cross sectional plane can be generated, by combining the tomographic data. The tomographic image obtained in this manner is displayed by the image display section 252. Note that the optical probe 230 may be moved in the horizontal direction in FIG. 1, to scan the measuring light beam L1 in a second direction perpendicular to the scanning direction described above. Thereby, tomographic images of cross sectional planes included in the second direction may further be obtained.

Next, the operation of the optical tomograph 200 will be described in order from the initial step to the final step. An operator inserts the optical probe 230 into the body cavity of a subject prior to obtaining a tomographic image. First, the base 23 of the optical path adjusting means 220 is manually operated to move in the direction of arrow A, to roughly set an optical path length. The optical path length is set such that a reference point, for example, a window incident point 16a where the reflected light beam L3 enters the window 16, is positioned within a measurable region. Thereafter, the optical path length is adjusted in real time, immediately prior to obtaining tomographic data at each point. The details of the real time optical path length adjustment will be described hereinafter.

First, tomographic data for adjusting the optical path length is obtained by the same operations as those for obtaining the tomographic data for generating the tomographic image described above. The tomographic data obtaining section 250 outputs the tomographic data for adjusting the optical path length to the real time optical path length adjusting section 253. Note that the tomographic data is data regarding the distribution of reflectance intensity in the depth direction of the measurement target S, as described previously. The real time optical path length adjusting section 253 calculates an optical path length adjustment value, which is the direction and amount of movement of the base 23 of the optical path length adjusting means 220, such that the combined optical path length of the measurement light beam L1 and the reflected light beam L3 matches the optical path length of the reference light beam L2, at the window incident point 16a where the reflected light intensity becomes maximal, based on the tomographic data. The calculated optical path length adjustment value is output to the mirror moving means 24 of the optical path length adjusting means 220. The mirror moving means 24 moves the base 23 of the mirror 22, based on the optical path length adjustment value. The position of the mirror 22 is adjusted such that the combined optical path length of the measurement light beam L1 and the reflected light beam L3 matches the optical path length of the reference light beam L2 by this optical path length adjusting operation. Thereafter, the tomographic data for generating the tomographic image is obtained.

The tomographic data for adjusting the optical path length is obtained each time that the position onto which the measuring light beam L1 is irradiated is shifted slightly in the manner described above. The optical path length of the reference light beam L2 is adjusted such that the combined optical path length of the measurement light beam L1 and the reflected light beam L3 matches the optical path length of the reference light beam L2 at the reference point 16a, based on the tomographic data for adjusting the optical path length.

As is clear from the above description, in the optical tomograph 200, the combined optical path length of the measuring light beam L1 and the reflected light beam L3 is automatically caused to match the optical path length of the reference light beam L2 at the window incident point 16a. Therefore, favorable optical tomographic images of the measurement target S can be obtained, even if changes occur in the optical path length of the measuring light beam L1 or the reference light beam L2 due to temperature changes or bending of the optical fibers.

In the present embodiment, the real time optical path length adjusting section 253 adjusts the optical path length of the reference light beam L2 each time that the position onto which the measuring light beam L1 is irradiated is changed. However, the adjustment of the optical path length does not necessarily need to be performed for each change in the irradiated position, that is, at each scanning position. The optical path length adjustment may be performed for every plural number of scanning positions. As another alternative, the optical path length may be adjusted at the first scanning position when obtaining tomographic data for a single rotation. Then, the tomographic data for generating the tomographic image may be obtained, without adjusting the optical path length thereafter. In this case, when the optical path length is adjusted, tomographic data for adjusting the optical path length may be obtained at a plurality of scanning positions, the optical path length adjustment value may be calculated based on each piece of the tomographic data, a mean of the optical path length adjustment value may be calculated, and the optical path length may be adjusted based on the mean value. The influence of margins of error can be reduced, by calculating the mean of the plurality of optical path length adjustment values.

Figure 2:
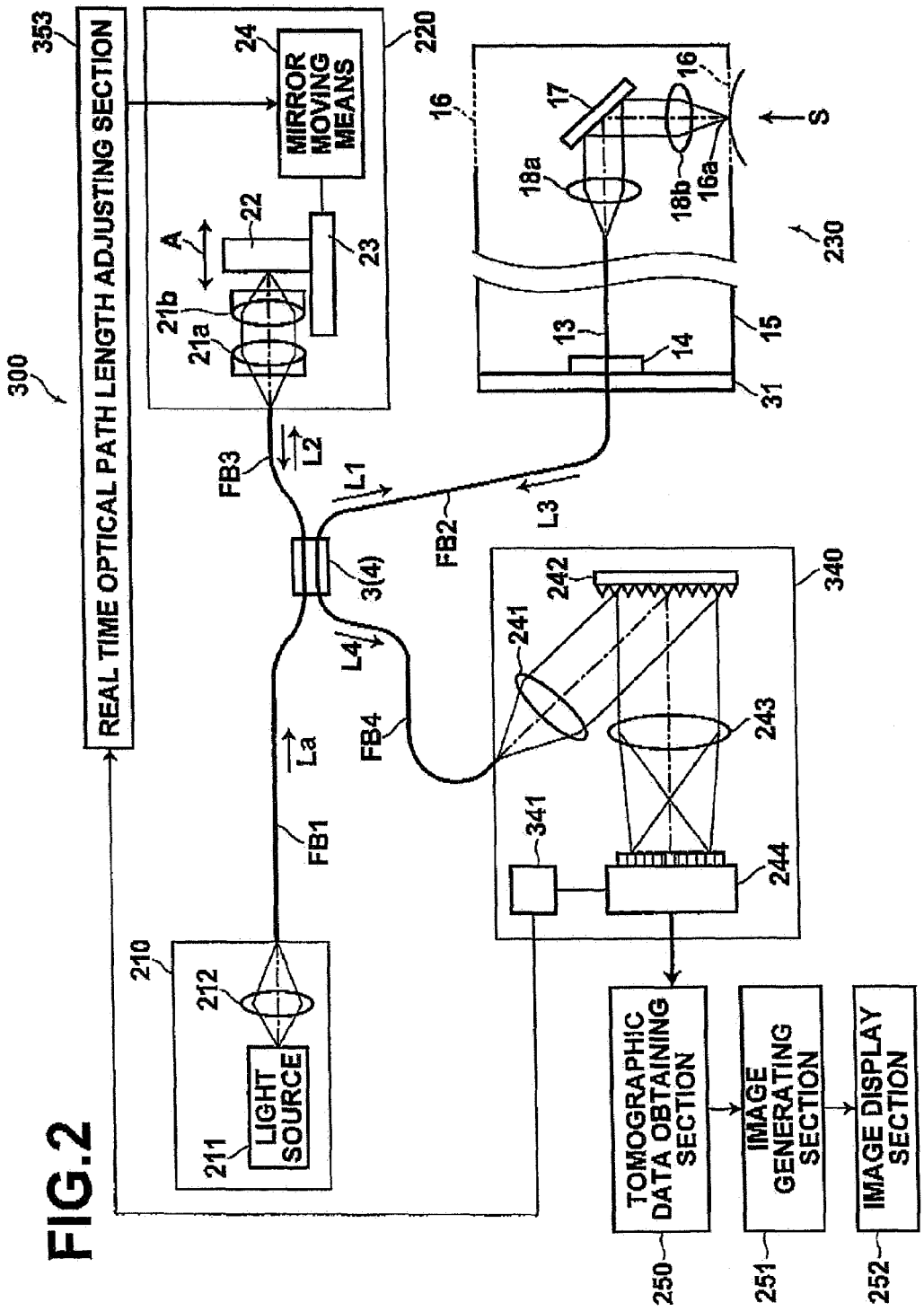
FIG. 2 is a diagram that illustrates the schematic structure of an optical tomograph according to a second embodiment of the present invention.

Next, a second embodiment of the present invention will be described. FIG. 2 is a diagram that illustrates the schematic structure of an optical tomograph 300 according to the second embodiment of the present invention. Note that in FIG. 2, components which are the same as those illustrated in FIG. 1 are denoted with the same reference numerals, and detailed descriptions thereof will be omitted insofar as they are not particularly necessary.

The optical tomograph 300 of the second embodiment adjusts the optical path length of the reference light beam L2 while monitoring integrated values, which are the spatially integrated intensities of the interference light beam L4, when adjusting the optical path length in real time. The combined optical path length of the measuring light beam L1 and the reflected light beam L3 is matched with the optical path length of the reference light beam L2 at the window incident point 16a, by comparing the magnitudes of the integrated values. The other structures and operations are basically the same as those of the optical tomograph 200 of the first embodiment.

An interference light detecting means 340 detects the interference light beam L4, which is formed by combining the reflected light beam L3 and the reference light beam L2. The interference light detecting means 340 comprises: the collimating lens 241; the diffraction grating 242; the CCD array 244; and an integrating section 341. The integrating section 341 integrates the outputs of each CCD of the CCD array 244, and outputs integrated values, that is, values that represent spatially integrated detected intensities of the interference light beam L4, to a real time optical path length adjusting section 353, when adjusting the optical path length of the reference light beam L2.

The operation of the optical tomograph 300 will be described in order from the initial step to the final step. An operator inserts the optical probe 230 into the body cavity of a subject prior to obtaining a tomographic image. The operator performs initial setting of an optical path length prior to obtainment of a tomographic image. In the initial setting, the base 23 of the optical path adjusting means 220 is manually operated to move in the direction of arrow A, to roughly set an optical path length. The optical path length is set such that a reference point, for example, the window incident point 16a, is positioned within a measurable region. Thereafter, the optical path length is adjusted in real time, immediately prior to obtaining tomographic data at each point.

Figure 3:
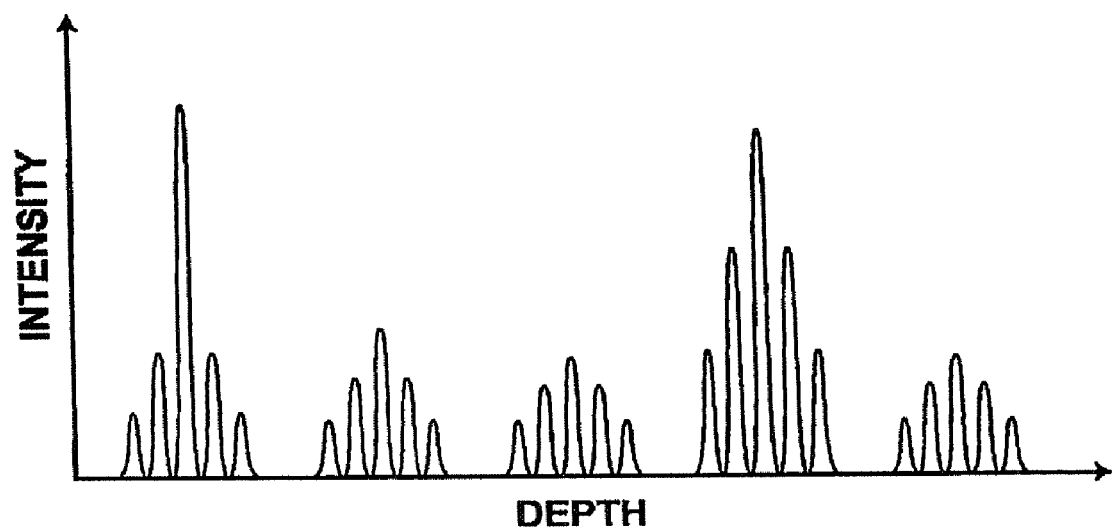
FIG. 3 is a graph that illustrates the relationship between the intensity of an interference light beam and depths within a measurement target.

Hereinafter, the operation for adjusting the optical path length in real time will be described with reference to the operations of the real time optical path length adjusting section 353. FIG. 3 is a graph that illustrates the relationship between an integrated value that represents a spatially or temporally integrated intensity of an interference light beam, and measurement depths. Generally, an integrated value obtained by integrating the intensity of an interference light beam represents the reflectance of a measuring light beam at a position where the combined optical path length of the measuring light beam and a reflected light beam matches the optical path length of a reference light beam. For this reason, comparing the integrated values obtained by spatially integrating the intensity of the interference light beam is equivalent to comparing the reflectances of the measuring light beam at positions where the combined optical path length of the measuring light beam and a reflected light beam matches the optical path length of a reference light beam.

The real time optical path length adjusting section 353 controls the mirror moving means 24 of the optical path length adjusting means 220 while monitoring the integrated values output from the integrating section 341, to move the base 23, on which second optical lens 21*b* and the mirror 22 are fixed, slightly in the direction of the optical axis of the first optical lens 21*a*. At this time, if the integrated value after moving the base 23 is greater than the integrated value prior to moving the base 23, the base 23 is moved further in the same direction. On the other hand, if the integrated value after moving the base 23 is less than the integrated value prior to moving the base 23, the base 23 is moved in the reverse direction. The fine movements of the base 23 are repeated in this manner, and the base 23 is ultimately stopped at a position from which the integrated value decreases in either direction, that is, a position at which the integrated value is maximal. By this operation, the combined optical path length of the measurement light beam L1 and the reflected light beam L3 can be matched with the optical path length of the reference light beam L2 at the reference point (the window incident point 16*a* in the present embodiment) at which the integrated value, that is, the reflectance, is maximal. Note that in the case that a greater amount of change in the optical path length is expected to be necessary, the range of change for the optical path length can be broadened, measurement results of integrated values as illustrated in FIG. 3 may be obtained, and a reference point at which the integrated value becomes maximal may be detected. Thereafter, the base 23 may be moved to the position at which the reference point was detected.

In the optical tomograph 300 as well, the optical path length of the reference light beam L2 is changed while monitoring the integrated values of the spatially integrated intensities of the interference light beam L4 each time that the position onto which the measuring light beam L1 is irradiated is shifted slightly in the manner described above. The optical path length of the reference light beam L2 is adjusted such that the combined optical path length of the measurement light beam L1 and the reflected light beam L3 matches the optical path length of the reference light beam L2 at the window incident point 16*a*, by comparing the magnitudes of the integrated values.

As is clear from the above description, in the optical tomograph 300, the combined optical path length of the measuring light beam L1 and the reflected light beam L3 is automatically caused to match the optical path length of the reference light beam L2 at the window incident point 16*a*. Therefore, favorable optical tomographic images of the measurement target S can be obtained, even if changes occur in the optical path length of the measuring light beam L1 or the reference light beam L2 due to temperature changes or bending of the optical fibers. In addition, the influence of noise can be reduced, by employing the integrated values that represent the spatially integrated intensity of the interference light beam L4. Therefore, the optical path length can be adjusted accurately.

In the present embodiment, the real time optical path length adjusting section 353 adjusts the optical path length of the reference light beam L2 each time that the position onto which the measuring light beam L1 is irradiated is changed. However, the adjustment of the optical path length does not necessarily need to be performed for each change in the irradiated position, that is, at each scanning position. The optical path length adjustment may be performed for every plural number of scanning positions. As another alternative, the optical path length may be adjusted at the first scanning position when obtaining tomographic data for a single rotation. Then, the tomographic data for generating the tomographic image may be obtained, without adjusting the optical path length thereafter. In this case, when the optical path length is adjusted, the reference point at which the integrated value becomes maximal may be obtained at a plurality of scanning positions, a mean reference point may be calculated, and the optical path length may be adjusted based on the mean reference point. The influence of margins of error can be reduced, by calculating the mean of the plurality of the reference points.

Figure 4:
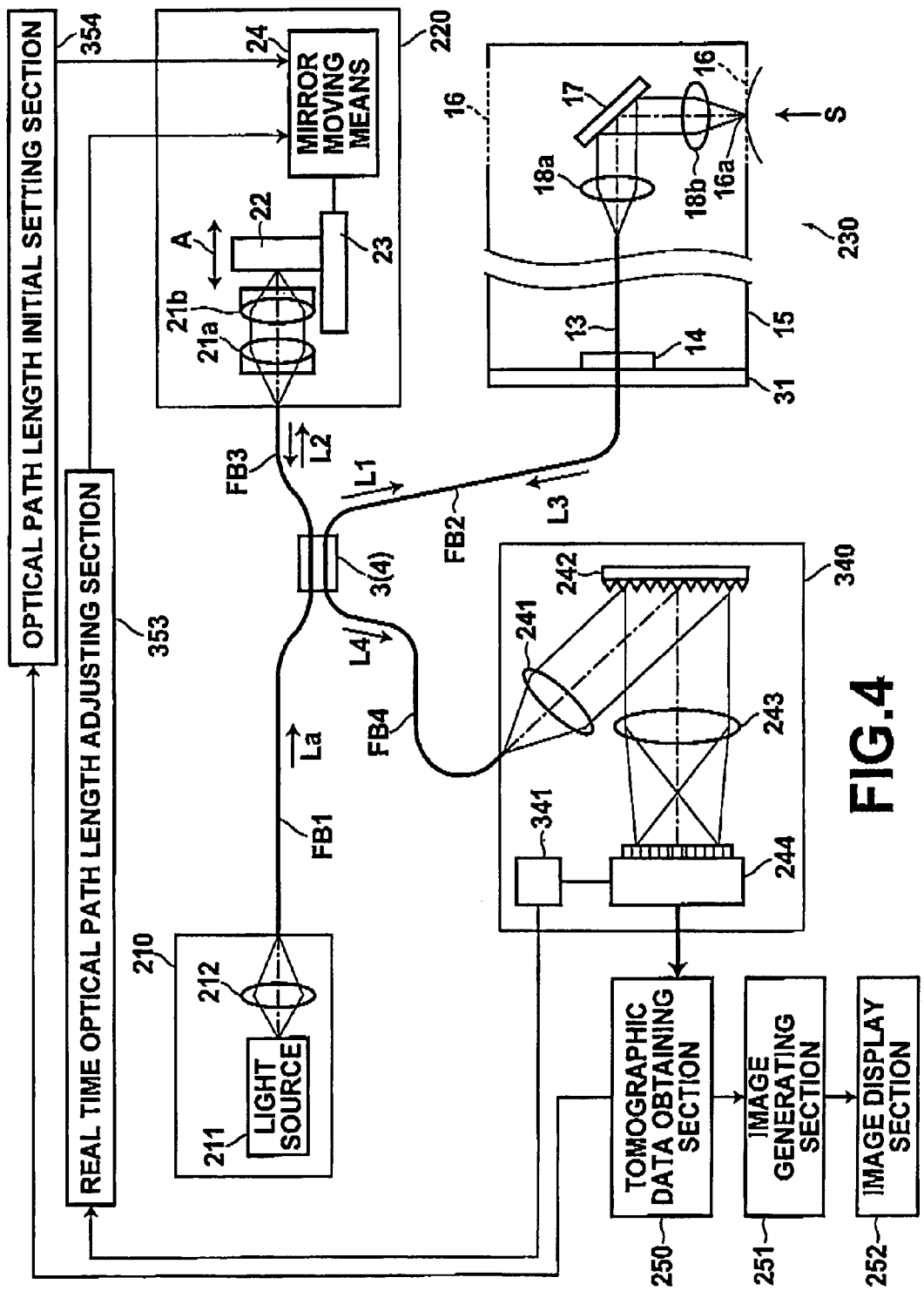
FIG. 4 is a diagram that illustrates the schematic structure of an optical tomograph according to a modified second embodiment of the present invention.

Note that as a modification to the present embodiment, an optical tomograph further comprising an optical path length initial setting section 354 separate from the real time optical path length adjusting section 353 may be considered, as illustrated in FIG. 4. The optical path length initial setting section 354 is connected to the tomographic data obtaining section 250 and the mirror driving means 24. The optical path length initial setting section 354 performs initial setting of the optical path length, prior to obtainment of a tomographic image.

The optical path length initial setting section 354 obtains tomographic data for adjusting the optical path length by the same operation as those performed by the optical path length adjusting section 253. The optical path length initial setting section 354 sets the initial value for the optical path length of the reference light beam L2 based on the tomographic data for adjusting the optical path length, such that the combined optical path length of the measuring light beam L1 and the reflected light beam L3 match the optical path length of the reference light beam L2 at the window incident point 16*a*. Thereafter, the real time optical path length adjusting section 353 adjusts the optical path length of the reference light beam L2 each time that the position onto which the measuring light beam L1 is irradiated is changed. Note that the optical path length initial setting section 354 may also adjust the optical path length, based on a plurality of pieces of tomographic data, detected at a plurality of scanning positions.

Figure 5:
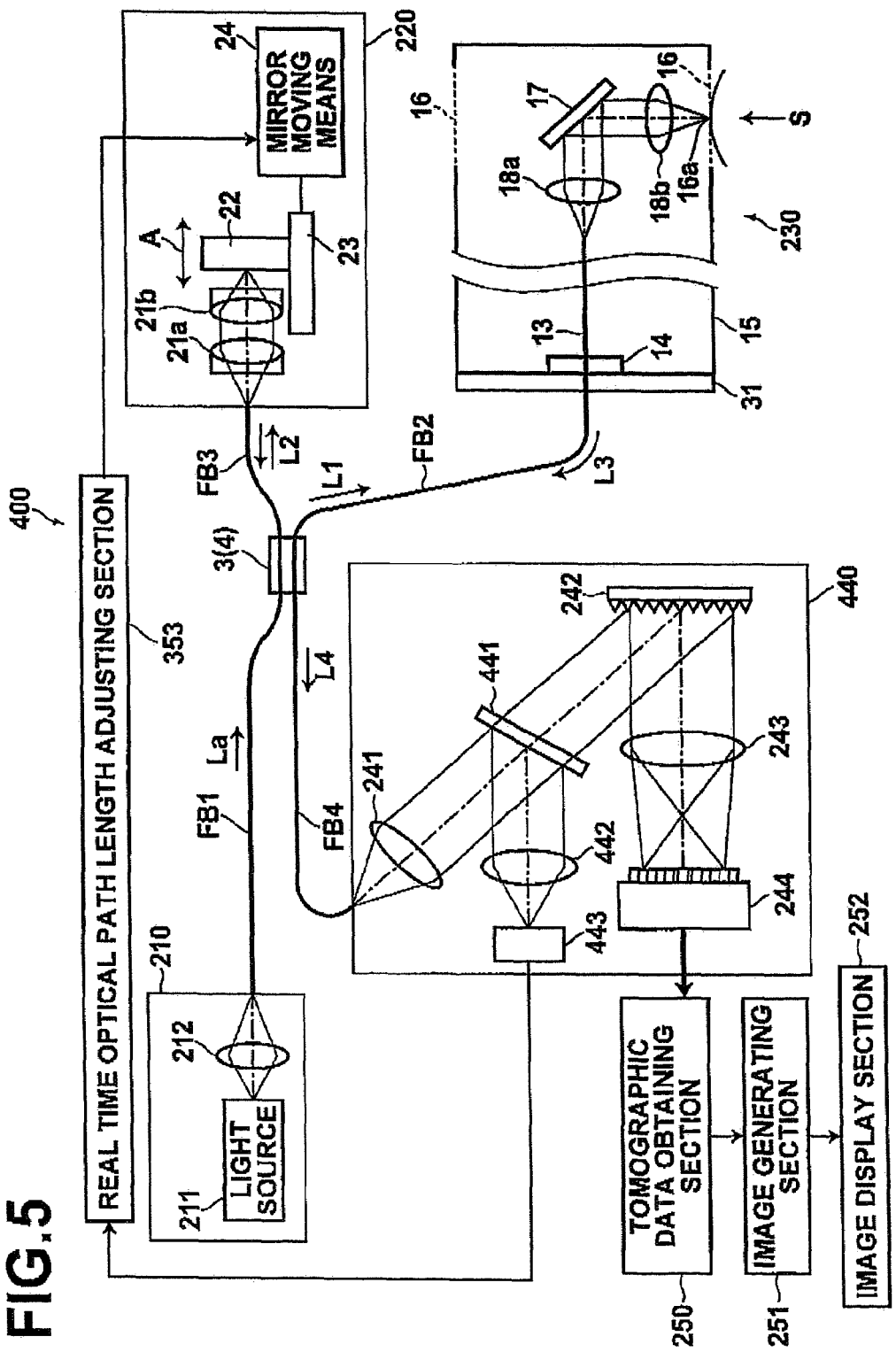
FIG. 5 is a diagram that illustrates the schematic structure of an optical tomograph according to a third embodiment of the present invention.

Next, a third embodiment of the present invention will be described. FIG. 5 is a diagram that illustrates the schematic structure of an optical tomograph 400 according to the third embodiment of the present invention. Note that in FIG. 5, components which are the same as those illustrated in FIG. 2 are denoted with the same reference numerals, and detailed descriptions thereof will be omitted insofar as they are not particularly necessary.

The optical tomograph 400 of the third embodiment differs from the previously described optical tomograph 300 of the second embodiment, in that it further comprises: a light separating means 441, for separating a portion of the interference light beam L4 prior to spectral decomposition; a lens 442, for focusing the separated portion of the interference light beam L4; and a photodetector 443, for detecting the intensity of the separated portion of the interference light beam L4. The other structures and operations are basically the same as those of the optical tomograph 300 of the second embodiment.

An interference light detecting means 440 detects the interference light beam L4, which is formed by combining the reflected light beam L3 and the reference light beam L2. The interference light detecting means 440 comprises: the collimating lens 241; the diffraction grating 242; the CCD array 244; the light separating means 441, for reflecting and separating 10% of the interference light beam L4 prior to spectral decomposition; the lens 442, for focusing the separated portion of the interference light beam L4; and the photodetector 443, for detecting the intensity of the separated portion of the interference light beam L4. Note that a mirror that transmits 90% and reflects 10% of light incident thereon may be employed as the light separating means 441, for example. In addition, the output value of the photodetector 443 is 10% of the integrated value obtained by spatially integrating the interference light beam L4, and is equivalent to 10% of the output of the integrating section 341 of the optical tomograph 300.

The real time optical path length adjusting section 353 adjusts the optical path length of the reference light beam L2, while monitoring the light intensity output from the photodetector 443, instead of the integrated values output from the integrating section 341. The optical path length of the reference light beam L2 is adjusted such that the combined optical path length of the measurement light beam L1 and the reflected light beam L3 matches the optical path length of the reference light beam L2 at the window incident point 16a, by comparing the magnitudes of the light intensities.

As is clear from the above description, in the optical tomograph 400 as well, the combined optical path length of the measuring light beam L1 and the reflected light beam L3 is automatically caused to match the optical path length of the reference light beam L2 at the window incident point 16a. Therefore, favorable optical tomographic images of the measurement target S can be obtained, even if changes occur in the optical path length of the measuring light beam L1 or the reference light beam L2 due to temperature changes or bending of the optical fibers. In addition, the influence of noise can be reduced, by employing the integrated values that represent the spatially integrated intensity of the interference light beam L4. Therefore, the optical path length can be adjusted accurately. Further, in the present embodiment, the light intensity of the portion of the interference light beam L4, which is separated prior to being spectrally decomposed and detected by the photodetector 443, is employed to adjust the optical path length. Therefore, it becomes unnecessary to detect the spectrally decomposed interference light beam L4 and to integrate the detected values. Accordingly, the optical path length can be adjusted expediently.

In the present embodiment as well, the real time optical path length adjusting section 353 may perform the optical path length adjustment for every plural number of scanning positions. As another alternative, optical path length adjustment may be performed at the first scanning position when obtaining tomographic data for a single rotation. Then, the tomographic data for generating the tomographic image may be obtained, without adjusting the optical path length thereafter. In this case, when the optical path length is adjusted, the reference point at which the integrated value becomes maximal may be obtained at a plurality of scanning positions, a mean reference point may be calculated, and the optical path length may be adjusted based on the mean reference point. The influence of margins of error can be reduced, by calculating the mean of the plurality of the reference points.

Further, the optical tomograph 400 of the third embodiment may further comprise the optical path length initial setting section 354, in the same manner as the modified second embodiment illustrated in FIG. 4. In this case, the initial setting of the optical path length may be automatically performed prior to obtaining a tomographic image.

Figure 6:
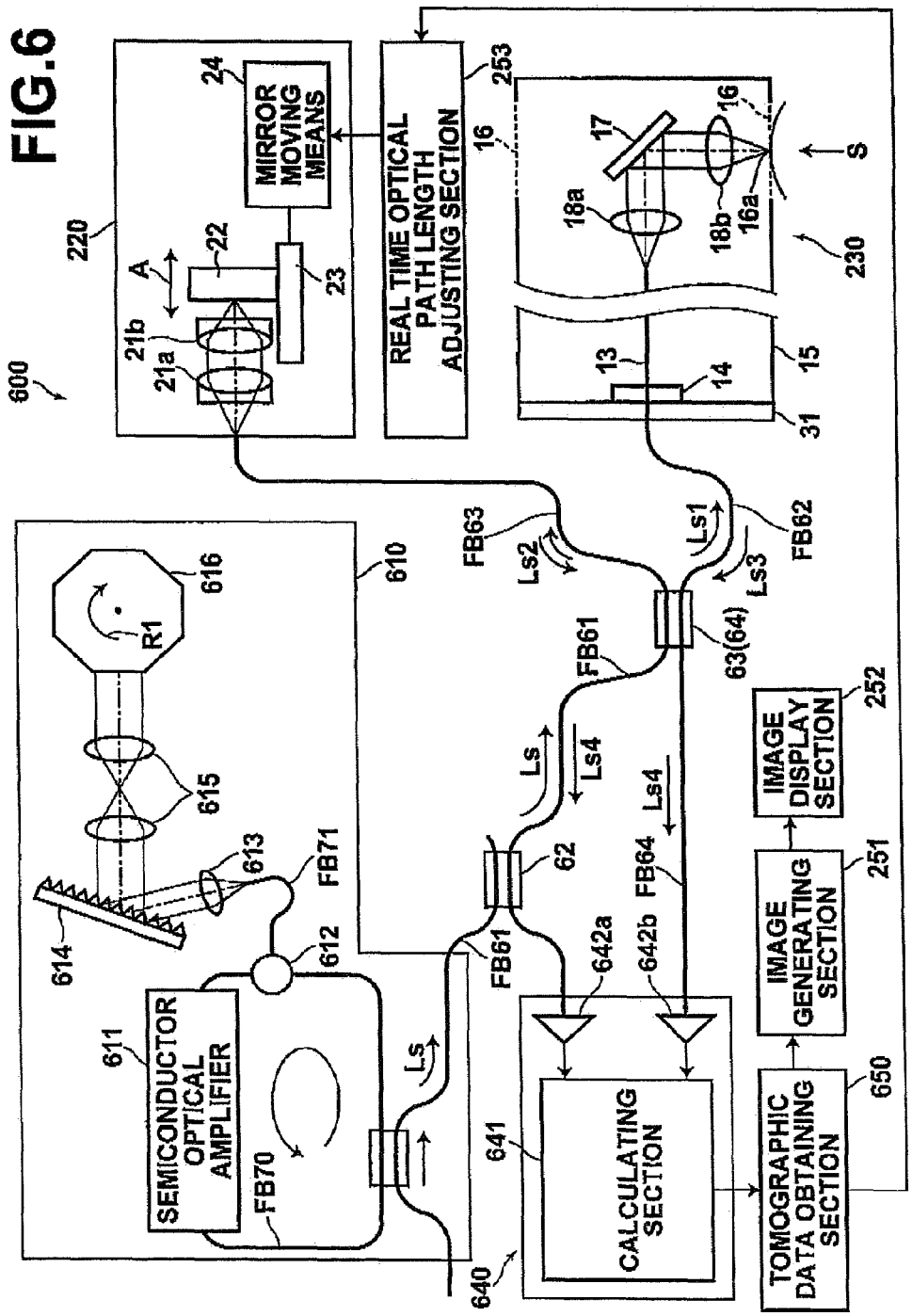
FIG. 6 is a diagram that illustrates the schematic structure of an optical tomograph according to a fourth embodiment of the present invention.

Next, a fourth embodiment of the present invention will be described. FIG. 6 is a diagram that illustrates the schematic structure of an optical tomograph 600 according to the second embodiment of the present invention. Note that in FIG. 6, components which are the same as those illustrated in FIG. 1 are denoted with the same reference numerals, and detailed descriptions thereof will be omitted insofar as they are not particularly necessary.

The optical tomograph 600 of the fourth embodiment differs from the optical tomograph 200 of the first embodiment in that it obtains tomographic images of measurement targets by the aforementioned SS-OCT measurement. The other structures and operations are basically the same as those of the optical tomograph 200 of the first embodiment.

The optical tomography apparatus 600 comprises: a light source unit 610, for emitting a laser beam Ls; a light dividing means 63, for dividing the laser beam Ls into a measuring light beam Ls1 and a reference light beam Ls2; the optical path length adjusting means 220, for adjusting the optical path length of the reference light beam Ls2; the optical probe 230 for irradiating the measuring light beam Ls1 divided by the light dividing means 63 onto a measurement target S; a multiplexing means 64, for multiplexing a reflected light beam Ls3, which is the measuring light beam Ls1 reflected from the measurement target S, and the reference light beam Ls2; an interference light detecting means 640, for detecting an interference light beam Ls4, formed by multiplexing the reflected light beam Ls3 and the reference light beam Ls2; a tomographic data obtaining section 650, for obtaining tomographic data based on the detection results of the interference light detecting means 640; the tomographic image generating section 251, for generating a tomographic image from the tomographic data obtained by the tomographic data obtaining section 650; the image display section 252, for displaying the tomographic image generated by the image generating section 251; and the real time optical path length adjusting section 253, for adjusting the optical path length of the reference light beam Ls2, based on the tomographic data obtained by the tomographic data obtaining section 650.

Figure 7:
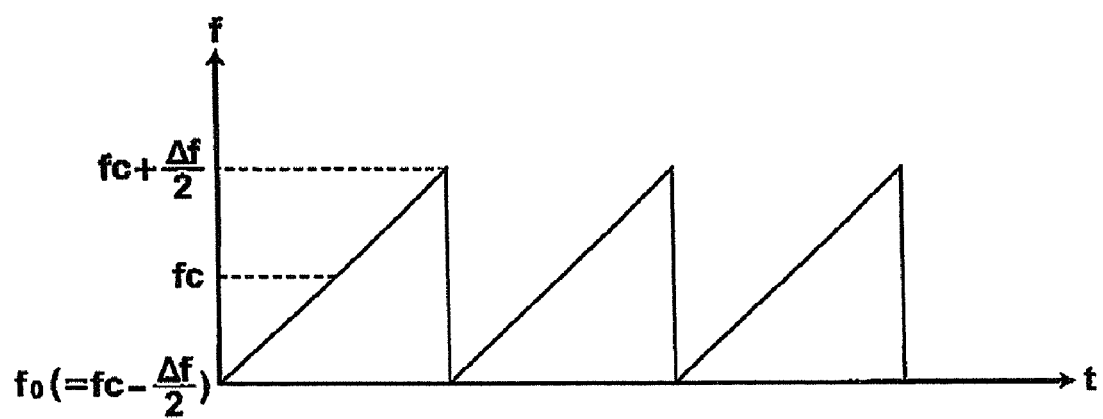
FIG. 7 is a graph for explaining the state of frequency sweeping in a swept frequency laser beam.

The light source unit 610 emits the laser beam Ls while sweeping the frequency thereof at a predetermined period. As illustrated in FIG. 7, the frequency f of the laser beam Ls is swept within a predetermined frequency sweep width $\Delta f$ having a central frequency fc. Accordingly, the frequency F is swept in a saw blade pattern within the range of a frequency $_0$ (fc$-\Delta f/2$) to (fc$+\Delta f/2$).

Note that for the sake of simplicity in description, the variation in the frequency f of the laser beam Ls will be described. However, the frequency f=light speed c/wavelength $\lambda$. Therefore, varying the frequency f of the laser beam Ls at a predetermined period is equivalent to varying the wavelength $\lambda$ of the laser beam Ls. The central frequency fc illustrated in FIG. 7 is the central wavelength $\lambda$sc when the wavelength $\lambda$ is swept at the predetermined period, and the frequency sweep width $\Delta f$ is equivalent to a wavelength sweep width $\Delta s\lambda$. In addition, FIG. 7 illustrates an example in which the frequency is swept in a saw blade pattern. However, the frequency may be swept with any other waveform.

The light source unit 610 comprises: a semiconductor optical amplifier 611 (semiconductor gain medium); and an optical fiber FB70. The optical fiber FB70 is connected to both ends of the semiconductor optical amplifier 611. The semiconductor optical amplifier 611 functions to emit a slight amount of light into a first end of the optical fiber FB70, when a drive current is injected thereinto, and to amplify the light that enters it from a second end of the optical fiber FB70. When the drive current is supplied to the semiconductor optical amplifier 611, the saw blade waveform laser beam Ls is emitted to an optical fiber FB61 from an optical resonator formed by the semiconductor optical amplifier 611 and the optical fiber FB70.

Further, an optical divider 612 is linked to the optical fiber FB70, and a portion of the light beam that propagates within the optical fiber FB70 is emitted from the optical divider 612 into an optical fiber FB71. The light beam, which is emitted from the optical finer FB71, passes through a collimating lens 613, a diffraction grating 614, and an optical system 615, to be reflected by a rotating polygon mirror 616. The light reflected by the rotating polygon mirror 616 passes through the optical system 615, the diffraction grating 614, and the collimating lens 613, to reenter the optical fiber FB71.

The rotating polygon mirror 616 rotates in the direction indicated by arrow R1, to vary the angle of each reflective surface thereof with respect to the optical axis of the optical system 615. Thereby, only a light beam having a specific frequency, from among the light spectrally split by the diffraction grating 614, is returned to the optical fiber FB71. The frequency of the light beam that reenters the optical fiber FB71 is determined by the angle formed by the optical axis of the optical system 615 and the reflective surface of the rotating polygon mirror 616. The light beam that reenters the optical fiber FB71 is caused to enter the optical fiber FB70 by the optical divider 612. As a result, the laser beam Ls of the specific frequency is emitted toward the optical fiber FB61.

Accordingly, when the rotating polygon mirror 616 is rotated in the direction of arrow R1 at a constant speed, the wavelength λ of the light beam that reenters the optical fiber FB71 is varied over time, at a constant period. In this manner, the laser beam Ls having the swept wavelengths is emitted to the optical fiber FB61 from the light source unit 610.

The light dividing means 63 is constituted by a 2×2 optical fiber coupler, for example. The light dividing means 63 functions to divide the light beam Ls, emitted by the light source unit 610 and guided through the optical fiber FB61, into the measuring light beam Ls1 and the reference light beam Ls2. The light dividing means 63 is optically connected to optical fibers FB62 and FB63. The measuring light beam Ls1 is guided through the optical fiber FB62, and the reference light beam Ls2 is guided through the optical fiber FB63. Note that the light dividing means 63 of the present embodiment also functions as the multiplexing means 64.

The optical probe 230 is optically connected to the optical fiber FB62, and the measuring light beam Ls1 is guided to the optical probe 230 through the optical fiber FB62.

Meanwhile, the optical path length adjusting means 220 is provided at the end of the optical fiber FB63 at which the reference light beam Ls2 is emitted.

The multiplexing means 64 is constituted by the aforementioned 2×2 optical coupler. The multiplexing means 64 multiplexes the reference light beam Ls2, of which the frequency has been shifted and the optical path length has been adjusted by the optical path length adjusting means 220, and the reflected light beam Ls3 reflected by the measurement target S. The multiplexed interference light beam Ls4 is emitted toward the interference light detecting means 640 via the optical fiber FB64.

The interference light detecting means 640 temporally spectrally decomposes and detects the interference light beam Ls4. The coherent light detecting means 640 comprises: InGaAs type photodetectors 642a and 642b, for detecting the intensity of the interference light beam Ls4 at a predetermined sampling frequency; and a calculating section 641, for adjusting the input balance of detection values obtained by the photodetectors 642a and 642b, to enable balanced detection. Note that the interference light beam Ls4 is divided into two light beams by the light dividing means 63, and the divided light beams are detected by the photodetectors 642a and 642b, respectively.

The calculating section 641 is connected to the tomographic data obtaining section 650. The tomographic data obtaining section 650 is connected to the image generating section 251 and the real time optical path length adjusting section 253. The image generating section 251 is connected to the image display section 252, which is a CRT, a liquid crystal display, or the like. The real time optical path length adjusting section 253 is connected to the optical path length adjusting means 220.

The tomographic data obtaining section 650 administers frequency analysis on interferograms (interference waveforms) of optical frequency regions, which are the outputs of the calculating section 641, to calculate reflectance of the measuring light beam Ls1 at each depth position within the measurement target. The calculated reflectances are employed to generate tomographic data.

Note that a detailed description of the detection of the interference light beam Ls4 and generation of the image by the interference light detecting means 640, the tomographic data obtaining section 650, and the image generating section 251 can be found in M. Takeda, "Optical Frequency Scanning Interference Microscopes", Optical Engineering Contact, Vol. 41, No. 7, pp. 426-432, 2003.

Note that the tomographic data obtaining section 650, the image generating section 251 and the real time optical path length adjusting section 253 are realized by a computer system such as a personal computer.

Hereinafter, the operation of the optical tomograph 600 having the construction described above will be described. First, the base 23 of the optical path adjusting means 220 is moved in the direction of arrow A, to set an optical path length set such that the measurement target S is positioned within a measurable region. The light beam Ls is emitted by the light source unit 610, and the light beam Ls is divided into the measuring light beam Ls1 and the reference light beam Ls2 by the light dividing means 3. The measuring light beam Ls1 is emitted within the body cavity from the optical probe 230, and irradiated on the measurement target S. At this time, the measuring light beam Ls1 is scanned one dimensionally along the measurement target S by the aforementioned operation of the optical probe 230. The reflected light beam Ls3, which is reflected by the measurement target S, is multiplexed with the reference light beam Ls2, which is reflected by a mirror 523, to form the interference light beam Ls4. The interference light beam L4 is detected by the interference light detecting means 640. The tomographic data obtaining section 650 administers appropriate waveform correction and noise removal on the detected interferograms (interference waveforms). Then, the tomographic data obtaining section 650 administers Fourier transform on the interference signal, and reflected light intensity distribution data is obtained regarding the depth direction of the measurement target S.

Then, the measuring light beam Ls1 is scanned on the measurement target S, by the motor 14 of the optical probe 230 rotating the optical fiber 13. Thereby, tomographic data is obtained for each portion of the measurement target S along the scanning direction. Therefore, a tomographic image representing an annular cross sectional plane can be generated, by combining the tomographic data. The tomographic image obtained in this manner is displayed by the image display section 252.

Next, the operation of the optical tomograph 600 will be described in order from the initial step to the final step. An operator inserts the optical probe 230 into the body cavity of a subject prior to obtaining a tomographic image. First, the base 23 of the optical path adjusting means 220 is manually operated to move in the direction of arrow A, to roughly set an optical path length. The optical path length is set such that a reference point, for example, a window incident point 16a where the reflected light beam L3 enters the window 16, is positioned within a measurable region. Thereafter, tomographic data for adjusting the optical path length is obtained at each point prior to obtaining the tomographic data for generating the tomographic image, by the same operations as those for obtaining the tomographic data for generating the tomographic image described above. The tomographic data obtaining section 650 outputs the tomographic data for adjusting the optical path length to the real time optical path length adjusting section 253. Note that the tomographic data is data regarding the distribution of reflectance intensity in the depth direction of the measurement target S, as described previously. The real time optical path length adjusting section 253 calculates an optical path length adjustment value, which is the direction and amount of movement of the base 23 of the optical path length adjusting means 220, such that the combined optical path length of the measurement light beam Ls1 and the reflected light beam Ls3 matches the optical path length of the reference light beam Ls2, at the window incident point 16a where the reflected light intensity becomes maximal, based on the tomographic data. The calculated optical path length adjustment value is output to the mirror moving means 24 of the optical path length adjusting means 220. The mirror moving means 24 moves the base 23 of the mirror 22, based on the optical path length adjustment value. The position of the mirror 22 is adjusted such that the combined optical path length of the measurement light beam Ls1 and the reflected light beam Ls3 matches the optical path length of the reference light beam Ls2 by this optical path length adjusting operation. Thereafter, the tomographic data for generating the tomographic image is obtained.

The tomographic data for adjusting the optical path length is obtained each time that the position onto which the measuring light beam Ls1 is irradiated is shifted slightly in the manner described above. The optical path length of the reference light beam Ls2 is adjusted such that the combined optical path length of the measurement light beam Ls1 and the reflected light beam Ls3 matches the optical path length of the reference light beam Ls2 at the reference point 16a, based on the tomographic data for adjusting the optical path length.

As is clear from the above description, in the optical tomograph 600, the combined optical path length of the measuring light beam Ls1 and the reflected light beam Ls3 is automatically caused to match the optical path length of the reference light beam Ls2 at the window incident point 16a. Therefore, favorable optical tomographic images of the measurement target S can be obtained, even if changes occur in the optical path length of the measuring light beam Ls1 or the reference light beam Ls2 due to temperature changes or bending of the optical fibers.

In the present embodiment, the real time optical path length adjusting section 253 adjusts the optical path length of the reference light beam L2 each time that the position onto which the measuring light beam L1 is irradiated is changed. However, the adjustment of the optical path length does not necessarily need to be performed for each change in the irradiated position, that is, at each scanning position. The optical path length adjustment may be performed for every plural number of scanning positions. As another alternative, the optical path length may be adjusted at the first scanning position when obtaining tomographic data for a single rotation. Then, the tomographic data for generating the tomographic image may be obtained, without adjusting the optical path length thereafter. In this case, when the optical path length is adjusted, tomographic data for adjusting the optical path length may be obtained at a plurality of scanning positions, the optical path length adjustment value may be calculated based on each piece of the tomographic data, a mean of the optical path length adjustment value may be calculated, and the optical path length may be adjusted based on the mean value. The influence of margins of error can be reduced, by calculating the mean of the plurality of optical path length adjustment values.

In the present embodiment as well, the real time optical path length adjusting section 253 adjusts the optical path length of the reference light beam Ls2 each time that the position, onto which the measuring light beam Ls1 is irradiated, is slightly moved. However, adjustment of the optical path length need not be performed each time that the position that the measuring light beam Ls1 is irradiated onto is moved, that is, at each scanning position. Alternatively, the optical path length adjusting section 253 may perform the optical path length adjustment for every plural number of scanning positions. As another alternative, optical path length adjustment may be performed at the first scanning position when obtaining tomographic data for a single rotation. Then, the tomographic data for generating the tomographic image may be obtained, without adjusting the optical path length thereafter. In this case, when the optical path length is adjusted, tomographic data for adjusting the optical path length may be obtained at a plurality of scanning positions, the optical path length adjustment value may be calculated based on each piece of the tomographic data, a mean of the optical path length adjustment value may be calculated, and the optical path length may be adjusted based on the mean value. The influence of margins of error can be reduced, by calculating the mean of the plurality of optical path length adjustment values.

Figure 8:
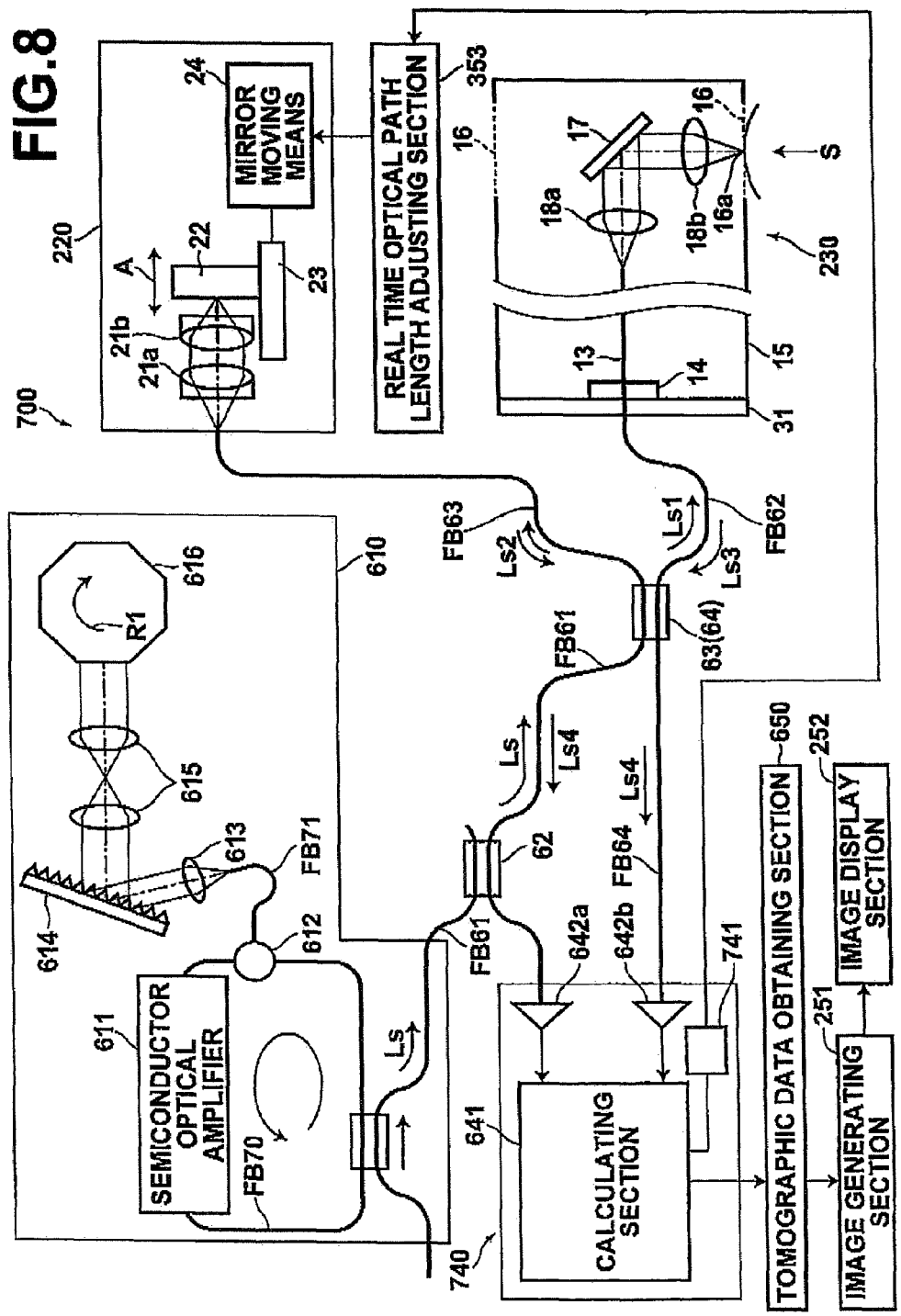
FIG. 8 is a diagram that illustrates the schematic structure of an optical tomograph according to a fifth embodiment of the present invention.

Next, a fifth embodiment of the present invention will be described. FIG. 8 is a diagram that illustrates the schematic structure of an optical tomograph 700 according to the fifth embodiment of the present invention. Note that in FIG. 8, components which are the same as those illustrated in FIG. 6 are denoted with the same reference numerals, and detailed descriptions thereof will be omitted insofar as they are not particularly necessary.

The optical tomograph 700 of the fifth embodiment adjusts the optical path length of the reference light beam Ls2 while monitoring integrated values, which are the temporally integrated intensities of the interference light beam Ls4, when adjusting the optical path length in real time. The combined optical path length of the measuring light beam Ls1 and the reflected light beam Ls3 is matched with the optical path length of the reference light beam Ls2 at the window incident point 16a, by comparing the magnitudes of the integrated values. The other structures and operations are basically the same as those of the optical tomograph 600 of the fourth embodiment.

An interference light detecting means 740 temporally spectrally decomposes and detects the interference light beam Ls4, formed by the multiplexing means 64 multiplexing the reflected light beam Ls3 and the reference light beam Ls2. The coherent light detecting means 740 comprises: InGaAs type photodetectors 642a and 642b, for detecting the intensity of the interference light beam Ls4 at a predetermined sampling frequency; and a calculating section 641, for adjusting the input balance of detection values obtained by the photodetectors 642a and 642b, to enable balanced detection. Note that the interference light beam Ls4 is divided into two light beams by the light dividing means 63, and the divided light beams are detected by the photodetectors 642a and 642b, respectively. The interference light detecting means 740 further comprises an integrating section 741, which is connected to the calculating section 641. The integrating section 741 integrates the outputs of the calculating section 641 for a single period of wavelength sweeping, and outputs integrated values, that is, values that represent temporally integrated intensities of the interference light beam Ls4, to the real time optical path length adjusting section 353, when adjusting the optical path length of the reference light beam Ls2. Generally, an integrated value obtained by integrating the intensity of an interference light beam represents the reflectance of a measuring light beam at a position where the combined optical path length of the measuring light beam and a reflected light beam matches the optical path length of a reference light beam. For this reason, comparing the integrated values obtained by temporally integrating the intensity of the interference light beam is equivalent to comparing the reflectances of the measuring light beam at positions where the combined optical path length of the measuring light beam and a reflected light beam matches the optical path length of a reference light beam.

The real time optical path length adjusting section 353 controls the mirror moving means 24 of the optical path length adjusting means 220 while monitoring the integrated values output from the integrating section 741, to move the base 23, on which second optical lens 21b and the mirror 22 are fixed, slightly in the direction of the optical axis of the first optical lens 21a. At this time, if the integrated value after moving the base 23 is greater than the integrated value prior to moving the base 23, the base 23 is moved further in the same direction. On the other hand, if the integrated value after moving the base 23 is less than the integrated value prior to moving the base 23, the base 23 is moved in the reverse direction. The fine movements of the base 23 are repeated in this manner, and the base 23 is ultimately stopped at a position from which the integrated value decreases in either direction, that is, a position at which the integrated value is maximal. By this operation, the combined optical path length of the measurement light beam Ls1 and the reflected light beam Ls3 can be matched with the optical path length of the reference light beam Ls2 at the window incident point 16a at which the integrated value, that is, the reflectance, is maximal. Note that in the case that a greater amount of change in the optical path length is expected to be necessary, the range of change for the optical path length can be broadened, measurement results of integrated values as illustrated in FIG. 3 may be obtained, and a reference point at which the integrated value becomes maximal may be detected. Thereafter, the base 23 may be moved to the position at which the reference point was detected.

In the optical tomograph 700 as well, the optical path length of the reference light beam Ls2 is changed while monitoring the integrated values of the temporally integrated intensities of the interference light beam Ls4 each time that the position onto which the measuring light beam Ls1 is irradiated is shifted slightly in the manner described above. The optical path length of the reference light beam Ls2 is adjusted such that the combined optical path length of the measurement light beam Ls1 and the reflected light beam Ls3 matches the optical path length of the reference light beam Ls2 at the window incident point 16a, by comparing the magnitudes of the integrated values.

As is clear from the above description, in the optical tomograph 700, the combined optical path length of the measuring light beam Ls1 and the reflected light beam Ls3 is automatically caused to match the optical path length of the reference light beam Ls2 at the window incident point 16a. Therefore, favorable optical tomographic images of the measurement target S can be obtained, even if changes occur in the optical path length of the measuring light beam Ls1 or the reference light beam Ls2 due to temperature changes or bending of the optical fibers. In addition, the influence of noise can be reduced, by employing the integrated values that represent the temporally integrated intensity of the interference light beam Ls4. Therefore, the optical path length can be adjusted accurately.

In the present embodiment, the real time optical path length adjusting section 353 adjusts the optical path length of the reference light beam Ls2 each time that the position onto which the measuring light beam Ls1 is irradiated is changed. However, the adjustment of the optical path length does not necessarily need to be performed for each change in the irradiated position, that is, at each scanning position. The optical path length adjustment may be performed for every plural number of scanning positions. As another alternative, the optical path length may be adjusted at the first scanning position when obtaining tomographic data for a single rotation. Then, the tomographic data for generating the tomographic image may be obtained, without adjusting the optical path length thereafter. In this case, when the optical path length is adjusted, the reference point at which the integrated value becomes maximal may be obtained at a plurality of scanning positions, a mean reference point may be calculated, and the optical path length may be adjusted based on the mean reference point. The influence of margins of error can be reduced, by calculating the mean of the plurality of the reference points.

Figure 9:
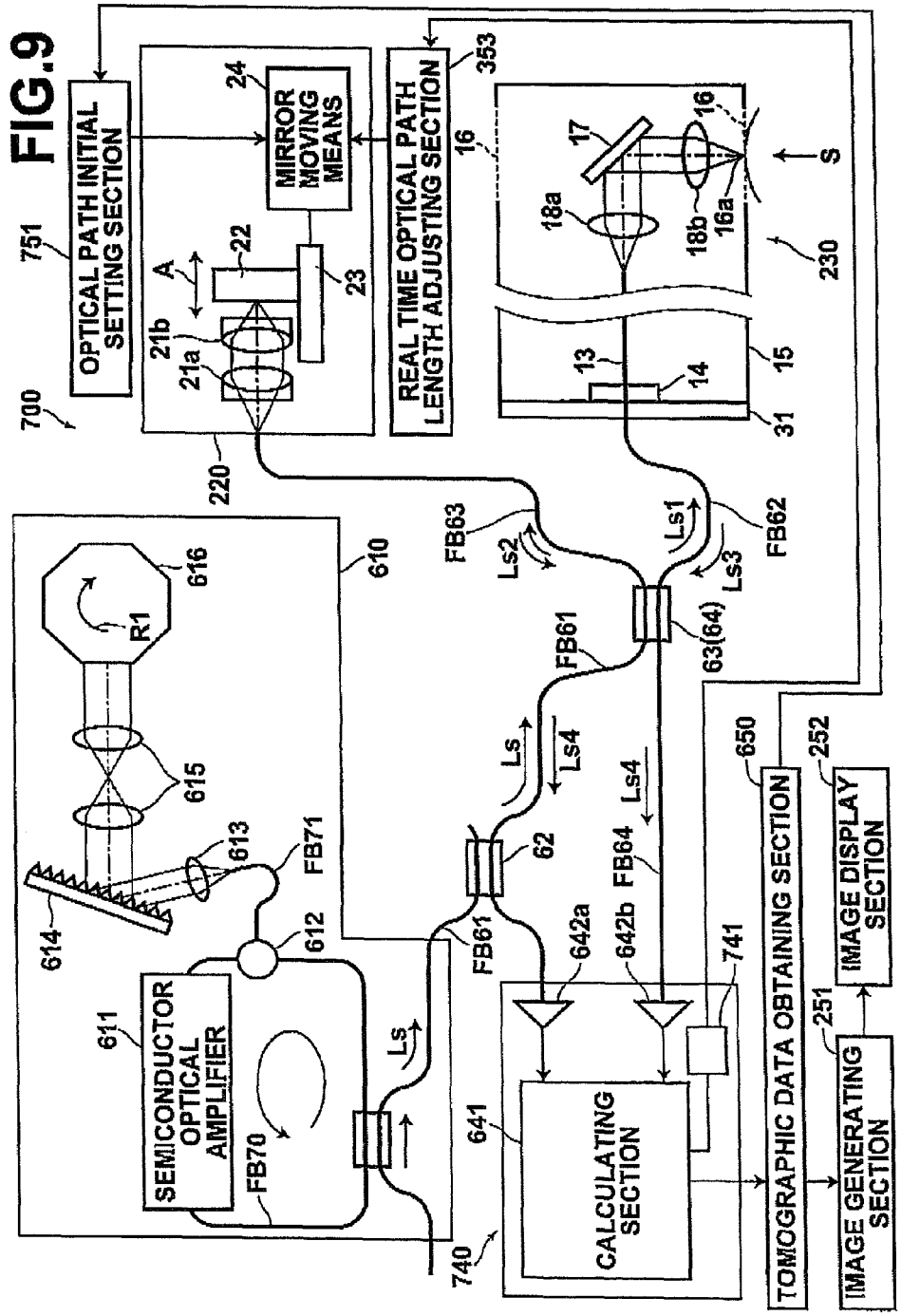
FIG. 9 is a diagram that illustrates the schematic structure of an optical tomograph according to a modified fifth embodiment of the present invention.

Note that as a modification to the present embodiment, an optical tomograph further comprising an optical path length initial setting section 751 separate from the real time optical path length adjusting section 353 may be considered, as illustrated in FIG. 9. The optical path length initial setting section 751 is connected to the tomographic data obtaining section 650 and the mirror driving means 24. The optical path length initial setting section 751 performs initial setting of the optical path length, prior to obtainment of a tomographic image.

The optical path length initial setting section 751 obtains tomographic data for adjusting the optical path length by the same operation as those performed by the optical path initial setting section 354 of the optical tomograph 600 illustrated in FIG. 6. The optical path length initial setting section 751 sets the initial value for the optical path length of the reference light beam L2 based on the tomographic data for adjusting the optical path length, such that the combined optical path length of the measuring light beam L1 and the reflected light beam L3 match the optical path length of the reference light beam L2 at the window incident point 16a. Thereafter, the real time optical path length adjusting section 353 adjusts the optical path length of the reference light beam L2 each time that the position onto which the measuring light beam L1 is irradiated is changed. Note that the optical path length initial setting section 751 may also adjust the optical path length, based on a plurality of pieces of tomographic data, detected at a plurality of scanning positions.

Figure 10:
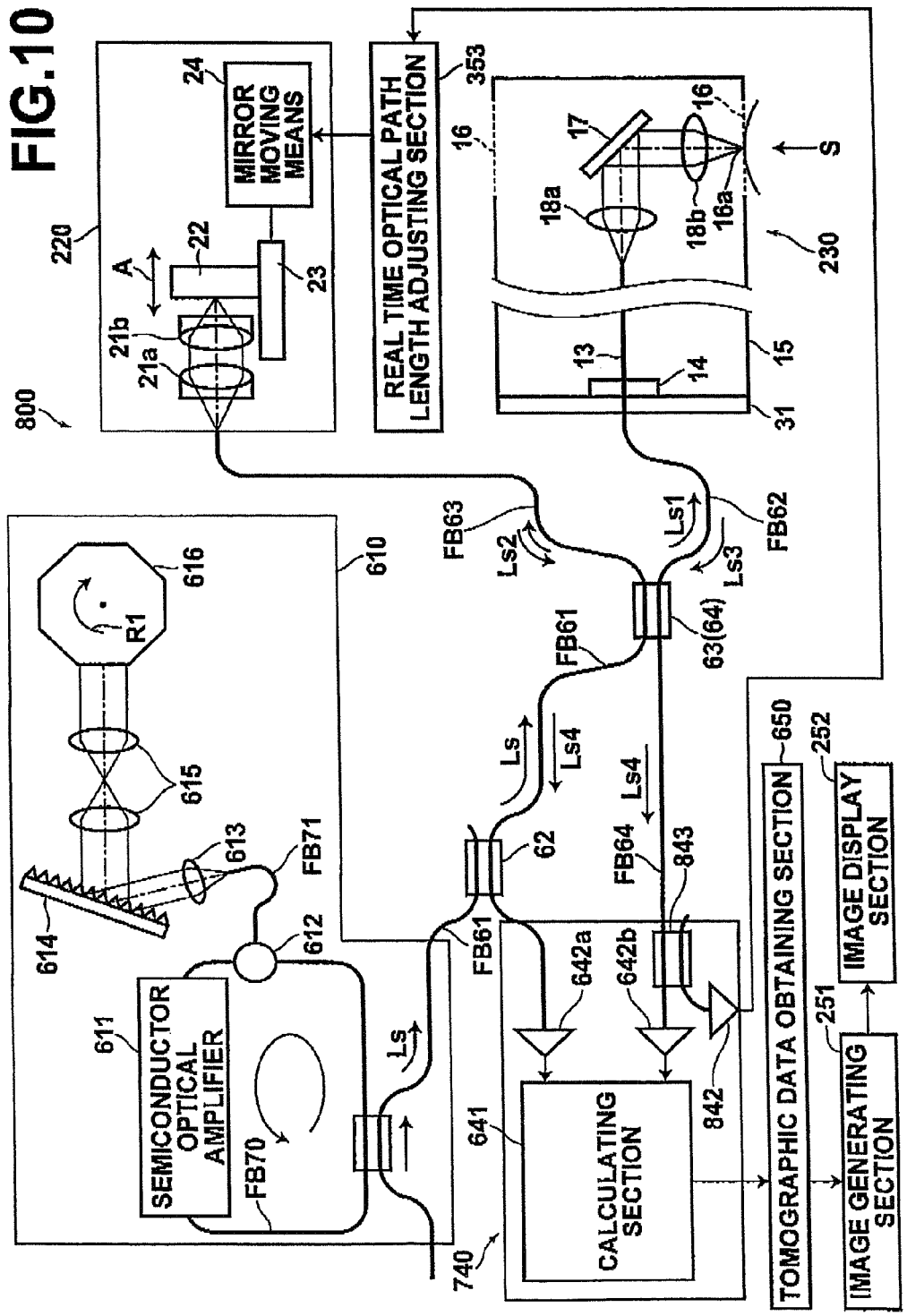
FIG. 10 is a diagram that illustrates the schematic structure of an optical tomograph according to a sixth embodiment of the present invention.

Next, a sixth embodiment of the present invention will be described. FIG. 10 is a diagram that illustrates the schematic structure of an optical tomograph 800 according to the sixth embodiment of the present invention. Note that in FIG. 10, components which are the same as those illustrated in FIG. 8 are denoted with the same reference numerals, and detailed descriptions thereof will be omitted insofar as they are not particularly necessary.

The optical tomograph 800 of the sixth embodiment differs from the previously described optical tomograph 700 of the fifth embodiment, in that it further comprises: a light separating means 841, for separating a portion of the interference light beam Ls4 prior to detection thereof; and a photodetector 842, for detecting the intensity of the separated portion of the interference light beam Ls4. The other structures and operations are basically the same as those of the optical tomograph 700 of the fifth embodiment.

A light divider 843 linked to the optical fiber 64, and an optical fiber FB80 linked to the light divider 843 may be employed as the light dividing means 841 of the interference light detecting means 840. The light divider 842 emits 10% of the light that propagates through the optical fiber FB64 toward the optical fiber FB80. The photodetector 842 detects the intensity of the separated portion of the interference light beam Ls4 for each period of frequency sweeping by the light source unit 610. The output value of the photodetector 443 is 10% of the integrated value obtained by temporally integrating the interference light beam L4, and is equivalent to 10% of the output of the integrating section 741 of the optical tomograph 700. Note that a portion may be formed along the optical path of the optical fiber FB64, through which light propagates through space, and a mirror that reflects a portion of the light may be provided in this space, as an alternate construction of the light dividing means 841.

The real time optical path length adjusting section 353 adjusts the optical path length of the reference light beam Ls2, while monitoring the light intensity output from the photodetector 842, instead of the integrated values output from the integrating section 741. The optical path length of the reference light beam Ls2 is adjusted such that the combined optical path length of the measurement light beam Ls1 and the reflected light beam Ls3 matches the optical path length of the reference light beam Ls2 at the window incident point 16*a*, by comparing the magnitudes of the light intensities.

As is clear from the above description, in the optical tomograph 800 as well, the combined optical path length of the measuring light beam Ls1 and the reflected light beam Ls3 is automatically caused to match the optical path length of the reference light beam Ls2 at the window incident point 16*a*. Therefore, favorable optical tomographic images of the measurement target S can be obtained, even if changes occur in the optical path length of the measuring light beam Ls1 or the reference light beam Ls2 due to temperature changes or bending of the optical fibers. In addition, the influence of noise can be reduced, by employing the integrated values that represent the temporally integrated intensity of the interference light beam Ls4. Therefore, the optical path length can be adjusted accurately. Further, in the present embodiment, the light intensity of the portion of the interference light beam Ls4, which is separated and detected by the photodetector 842, is employed to adjust the optical path length. Therefore, it becomes unnecessary to detect the temporally decomposed interference light beam L4 and to integrate the detected values. Accordingly, the optical path length can be adjusted expediently.

In the present embodiment as well, the real time optical path length adjusting section 353 may perform the optical path length adjustment for every plural number of scanning positions. As another alternative, optical path length adjustment may be performed at the first scanning position when obtaining tomographic data for a single rotation. Then, the tomographic data for generating the tomographic image may be obtained, without adjusting the optical path length thereafter. In this case, when the optical path length is adjusted, reference point at which the integrated value becomes maximal may be obtained at a plurality of scanning positions, a mean reference point may be calculated, and the optical path length may be adjusted based on the mean reference point. The influence of margins of error can be reduced, by calculating the mean of the plurality of the reference points.

Further, the optical tomograph 800 of the sixth embodiment may further comprise the optical path length initial setting section 751, in the same manner as the modified fifth embodiment illustrated in FIG. 9. In this case, the initial setting of the optical path length may be automatically performed prior to obtaining a tomographic image.

Note that the optical tomograph of the present invention is not limited to the embodiments described above. In the embodiments, the measuring light beam, the reference light beam, and the interference light beam all propagate through optical fibers. Alternatively, the light beams may propagate through air or through a vacuum.

When the detected intensity of the interference light beam is integrated either spatially or temporally, the entirety of the intensity of the interference light beam may be integrated, or a portion of the integrated light beam may be integrated.

In each of the embodiments described above, the optical path length of the reference light beam is adjusted. Alternatively, the optical path length of the measuring light beam or the reflected light beam may be adjusted.

Further, in the above embodiments, the window incident point 16*a* is the reference point at which the combined optical path length of the measuring light beam and the reflected light beam is matched with the optical path length of the reference light beam. However, the present invention is not limited to this configuration. Any point may be employed as the reference point, as long as the reflectance thereat is higher or lower than the vicinity thereof either in front or behind in the direction that the measuring light beam is incident on the measurement target. For example, the surface of the measurement target, or a boundary with other tissue may be employed as the reference point. In addition, in the above embodiments, the optical path length is adjusted such that the combined optical path length of the measuring light beam and the reflected light beam is matched with the optical path length of the reference light beam at the reference point. However, the present invention is not limited to this configuration. The optical path length may be adjusted such that the combined optical path length of the measuring light beam and the reflected light beam is matched with the optical path length of the reference light beam at a position which is a predetermined distance from the reference point, such as a position 0.5 mm toward the exterior of the window 16 from the window incident point 16*a*.

In the above embodiments, the optical path adjusting means is used to change the optical path length of the reference light beam in real time. However, the present invention is not limited to this configuration. Any adjusting means may be employed, as long as it is capable of adjusting the optical path length of the reference light beam. For example, an auxiliary reference light beam and an optical path length adjusting element, such as a piezoelectric element, may be provided in the optical path of the reference light beam, and the optical path length may be adjusted by the optical path length adjusting element.

In the above embodiments, the optical path adjusting means is used to change the optical path length of the reference light beam when adjusting the optical path length while monitoring the spatially or temporally integrated values of the intensity of the interference light beam. However, the distance variation in the optical path length in this case is small. Therefore, the optical path length may be adjusted by providing an element that can change the optical path length slightly, such as a piezoelectric element, in the optical path of the reference light beam.

Further, Michelson interferometers are employed in the above embodiments. However, the present invention is not limited to this configuration, and Mach-Zehnder interferometers may be employed, for example.

What is claimed is:

1. An optical tomograph, comprising:
   a light source unit for emitting a light beam;
   a light dividing section, for dividing the light beam emitted from the light source unit into a measuring light beam and a reference light beam;
   an irradiating section, for scanning and irradiating a measurement target with the measuring light beam, which has been divided by the light dividing section;
   a combining section, for combining a reflected light beam, which is the measuring light beam reflected by the measurement target, and the reference light beam;
   a first interference light detecting section, for detecting an interference light beam, which is formed by the reflected light beam and the reference light beam being combined by the combining section;
   a tomographic data obtaining section, for obtaining tomographic data of the measurement target at each scanning position, by administering frequency analysis on the interference light beam detected by the first interference light detecting section;
   a second interference light detecting section, for detecting the interference light beam; and
   an optical path length adjusting section, adjusting the optical path length of one of the measuring light beam, the reflected light beam, and the reference light beam, based on the detection results obtained by the second interference light detecting section.

2. An optical tomograph as defined in claim 1, further comprising:
   an optical path length changing section; wherein:
   the second interference light detecting section outputs an integrated value, in which the interference light is spatially or temporally integrated; and
   the optical path length adjusting section compares the integrated value output by the second interference light detecting section obtained prior to and the integrated value output by the second interference light detection section obtained following the optical path length changing section changing the optical path length, and adjusts the optical path length based on the results of the comparison.

3. An optical tomograph as defined in claim 2, wherein:
   the optical path length adjusting section adjusts the optical path length of one of the measuring light beam, the reflected light beam, and the reference light beam, based on a plurality of detection results obtained from a plurality of scanning positions within the measurement target.

4. An optical tomograph as defined in claim 3, wherein:
   the first interference light detecting section also functions as the second interference light detecting section.

5. An optical tomograph as defined in claim 2, wherein:
   the first interference light detecting section also functions as the second interference light detecting section.

6. An optical tomograph as defined in claim 2, further comprising:
   a light separating section, for separating the interference light beam into a light beam that enters the first interference light detecting section, and a light beam that enters the second interference light detecting section.

7. An optical tomograph as defined in claim 2, wherein:
   the integrated value represents a reflectance of the measuring light beam at a position where a combined optical path length of the measuring light beam and the reflected light beam matches the optical path length of the reference light beam.

8. An optical tomograph as defined in claim 2, wherein:
   fine adjustments to the optical path length are performed by the optical path length adjusting section such that:
   if the integrated value following changing of the optical path length is greater than the integrated value prior to the changing of the optical path length, the optical path length adjusting section adjusts the optical path length further in a same direction;
   if the integrated value following changing of the optical path length is less than the integrated value prior to the changing of the optical path length, the optical path length adjusting section adjusts the optical path length in a reverse direction;
   wherein the fine adjustments are repeated until the integrated value prior to the changing of the optical path length is maximal.

9. An optical tomograph as defined in claim 3, further comprising:
   a light separating section, for separating the interference light beam into a light beam that enters the first interference light detecting section, and a light beam that enters the second interference light detecting section.

10. An optical tomograph as defined in claim 1, wherein:
    the optical path length adjusting section adjusts the optical path length of one of the measuring light beam, the reflected light beam, and the reference light beam, based on a plurality of detection results obtained from a plurality of scanning positions within the measurement target.

11. An optical tomograph as defined in claim 10, wherein:
    the first interference light detecting section also functions as the second interference light detecting section.

12. An optical tomograph as defined in claim 10, further comprising:
    a light separating section, for separating the interference light beam into a light beam that enters the first interference light detecting section, and a light beam that enters the second interference light detecting section.

13. An optical tomograph as defined in claim 1, wherein:
    the first interference light detecting section also functions as the second interference light detecting section.

14. An optical tomograph as defined in claim 1, further comprising:
    a light separating section, for separating the interference light beam into a light beam that enters the first interference light detecting section, and a light beam that enters the second interference light detecting section.

15. An optical tomograph as defined in claim 14, wherein the light beam entering the first interference light detecting section is received by a first detector of the first interference light detecting section directly from the light separating section and the light beam entering the second interference light detecting section is reflected by a diffraction grating, which spectrally separates the light beam that enters the second interference light detecting section before entering a second detector of the second interference light detecting section.

16. An optical tomograph as defined in claim 15, wherein the first detector is a photodetector, which detects the intensity of the light beam entering therein, and the second detector is a CCD array, which detects each wavelength component of the spectrally decomposed interference light beam.

17. An optical tomograph as defined in claim 15, wherein the light beam that enters the first interference light detecting section comprises 10% of the interference light beam and the light beam that enters the second interference light detecting section comprises 90% of the interference light beam.

18. An optical tomograph as defined in claim 1, wherein:
the optical path length adjusting section obtains an optical path length adjustment value based on the detection results obtained by the second interference light detecting section, and corresponding to an adjustment amount for adjusting the optical path length of one of the measuring light beam, the reflected light beam, and the reference light beam.

19. An optical tomograph as defined in claim 18, wherein:
the optical path length adjusting section adjusts the optical path length of one of the measuring light beam, the reflected light beam, and the reference light beam only every plural number of scanning positions.

20. An optical tomograph as defined in claim 18, wherein:
a plurality of optical path length adjustment values are obtained each for one of a plurality of scanning positions, a mean optical path length adjustment value is obtained from the plurality of optical path length adjustment values, and the optical path length of one of the measuring light beam, the reflected light beam, and the reference light beam is adjusted based on mean optical path length adjustment value.

21. An optical tomograph as defined in claim 20, wherein each of the plurality of optical path length adjustment values are a direction and a movement amount for adjusting the optical path length, and the optical path length adjustment values are variable based on each of the detection results obtained by the second interference light detecting section.

22. An optical tomograph as defined in claim 18, wherein the optical path length adjustment value is a direction and a movement amount for adjusting the optical path length, and the optical path length adjustment value is variable based on the detection results obtained by the second interference light detecting section.

23. An optical tomograph as defined in claim 1, wherein:
the interference light beam is a common interference light beam produced by the combining section.

24. An optical tomograph as defined in claim 1, wherein the reflected light beam is transmitted in a first fiber optic cable and the reference light beam is transmitted in a second fiber optic cable separate and distinct from the first fiber optic cable.

25. An optical tomograph as defined in claim 1, wherein the light dividing section and the combining section are included in a same device.

26. An optical tomograph as defined in claim 25, wherein the same device is a fiber coupler.

27. An optical tomograph as defined in claim 1, wherein the first interference light detecting section and the second interference light detecting section detects a common interference light beam in a same mode.

* * * * *